(12) United States Patent
Xi et al.

(10) Patent No.: US 7,367,242 B2
(45) Date of Patent: May 6, 2008

(54) ACTIVE SENSOR FOR MICRO FORCE MEASUREMENT

(75) Inventors: Ning Xi, Okemos, MI (US); Yantao Shen, East Lansing, MI (US)

(73) Assignee: Board of Trustees operating Michigan State University, East Lansing, MI (US)

( * ) Notice: Subject to any disclaimer, the term of this patent is extended or adjusted under 35 U.S.C. 154(b) by 125 days.

(21) Appl. No.: 11/366,014

(22) Filed: Feb. 27, 2006

(65) Prior Publication Data

US 2006/0196280 A1  Sep. 7, 2006

Related U.S. Application Data

(60) Provisional application No. 60/657,909, filed on Mar. 2, 2005.

(51) Int. Cl.
*G01L 1/10* (2006.01)
(52) U.S. Cl. ............ 73/862.625; 73/862.634; 73/862.639; 73/104; 73/105; 73/579
(58) Field of Classification Search ............ 73/104, 73/105, 862.625, 862.634, 862.639
See application file for complete search history.

(56) References Cited

U.S. PATENT DOCUMENTS

| | | | |
|---|---|---|---|
| 4,588,975 A | 5/1986 | Roloff et al. | |
| 6,035,694 A | 3/2000 | Dupuie et al. | |
| 6,510,738 B1 | 1/2003 | Lee et al. | |
| 6,668,627 B2 | 12/2003 | Lange et al. | |
| 6,720,712 B2 | 4/2004 | Scott et al. | |
| 7,134,349 B2 * | 11/2006 | Xi et al. ............ | 73/862.634 |
| 2002/0089259 A1 * | 7/2002 | Iino et al. ............ | 310/325 |
| 2002/0089916 A1 | 7/2002 | Lee et al. | |
| 2005/0034543 A1 * | 2/2005 | Xi et al. ............ | 73/862.634 |

FOREIGN PATENT DOCUMENTS

JP  8-262039  10/1996

OTHER PUBLICATIONS

Qiangxian Huang et al, "Surface Topographic Measurement Using Piezoelectrical PVDF film Stylus", Transactions of the Institute of Electrical Engineers of Japan, PartC Inst. Electr. Eng. Japan, vol. 123-C, No. 3, Mar. 2003, pp. 505-510.

(Continued)

*Primary Examiner*—Edward Lefkowitz
*Assistant Examiner*—Freddie Kirkland, III
(74) *Attorney, Agent, or Firm*—Harness, Dickey & Pierce, P.L.C.

(57) ABSTRACT

An active micro-force sensor is provided for use on a micromanipulation device. The active micro-force sensor includes a cantilever structure having an actuator layer of piezoelectric material and a sensing layer of piezoelectric material bonded together. When an external force is exerted on the sensor, the sensor deforms and an applied force signal is recorded by the sensing layer. The applied force signal is then fed back to the actuating layer of the sensor via a servoed transfer function or servo controller, so that a counteracting deformation can be generated by the bending moment from the servoed actuating layer to quickly balance the deformation caused by the external micro-force. Once balanced, the sensor beam comes back to straight status and the tip will remain in its equilibrium position, thus the sensor stiffness seems to be virtually improved so that the accurate motion control of the sensor tip can be reached, especially, at the same time, the micro-force can also be obtained by solving the counteracting balance voltage applied to the actuating layer.

17 Claims, 10 Drawing Sheets

OTHER PUBLICATIONS

Yantano Shen et al., "Contact and Force Control in Microassembly", Proceedings of the 5th IEEE International Symposium on Assembly NAD task planning, Besancon, France, Jul. 10, 2003, pp. 60-65.

Shan-Min Swei et al., "On Improving Head-disk Interface in Hard Dis Drives Using Active Control", Proceedings of the 39th IEEE Conference on Decision and Contro, Sidney, Australia, vol. 4, Dec. 12, 2000, pp. 3106-3111.

Y. Shen et al, "A High Sensitivity Force Sensor for Microassembly: Design and Experiments". Proceedings of the IEEE/ASME International Conference on Advanced Intelligent Mechatronics, vol. 2, pp. 703-708, Jul. 20-24, 2003.

C.K.M. Fung et al, "A 2-D PVDF Force Sensing System for Micro-Manipulation and Micro-assembly", Proceedings ICRA '02. IEEE International Conference on Robotics and Automation, vol. 2, pp. 1489-1494, May 11-15, 2002.

C.K.M. Fung et al, "Internet-Based Remote Sensing and Manipulation in Micor Environment", Proceedings of 2001 IEEE/ASME International Conference on Advanced Intelligent Mechatronics, vol. 2, pp. 695-700, Jul. 8-12, 2001.

Yu Sung et al, "Actively Servoed Multi-Axis Microforce Sensors", Proceedings of the 2003 IEEE/ASME International Conference on Robotics & Automation, pp. 294-299, Sep. 14-19, 2003.

Young-Sup Lee et al, "Matched Piezoelectric Double Sensor/Actuator Pairs For Beam Motion Control", Institute of Physics Publishing, Smart Materials and Structures 12, pp. 541-548, Jun. 25, 2003.

Marc S. Weinberg, "Working Equations For Piezoelectric Actuators and Sensors", Journal of Microelectromechanical Systems, vol. 8, No. 4, pp. 529-533 Dec. 1999.

Paolo Gaudenzi et al, "Control of Beam Vibrations By Means of Piezoelectric Devices: Theory and Experiments", Elsevier Science, Ltd., Composite Structures 50, pp. 373-379, 2000.

Forouza Pourki, "Distributed Controllers For Flexible Structures Using Piezo-Electric Actuator/Sensors", Proceedings of the 32$^{nd}$ Conference on Decision and Control, pp. 1367-1370 Dec. 1993.

T.E. Alberts et al, "Experimental Verification of Transfer Functions For a Slewing Piezoelectric Laminate Beam", Control Engineering Practice, vol. 3. No. 2., pp. 163-170, 1995.

S.O. Reza Moheimani, "Experimental Verification of the Corrected Transfer Function of a Piezoelectric Laminate Beam", Proceedings of the IEEE International Conference on Transactions on Control Systems Technology, vol. 8, No. 4, Jul. 2000.

Don DeVoe et al, "Modeling and Optimal Design of Piezoelectric Cantilever Microactuators", Journal of Microelectromechanical Systems, vol. 6, No. 3, Sep. 1997.

Edward F. Crawley et al, "Use of Piezoelectric Actuators as Elements of Intelligent Structures", Presented as Paper 86-0878 at the AIAA/ASME/ASCE/AHS 27$^{th}$ Structures, Structural Dynamics and Materials Conference, vol. 25, No. 10, May 19-21, 1986.

Thomas Bailey et al, "Distributed Piezoelectric-Polymer Active Vibration Control of a Cantilever Beam", American Institute of Aeronautics and Astronautics, Inc., vol. 8, No. 5, Sep.-Oct. 1985.

Domenico Campolo et al, "Development of Piezoelectric Bending Actuators with Embedded Piezoelectric Sensors for Micromechanical Flapping Mechanisms", Proceedings of the IEEE International Conference, pp. 3339-3346, 2003.

Ellad B.Tadmor et al, "Electromechanical Coupling Correction For Piezoelectric Layered Beams", Journal of Microelectromechanical Systems, vol. 12, No. 6, Dec. 2003.

* cited by examiner

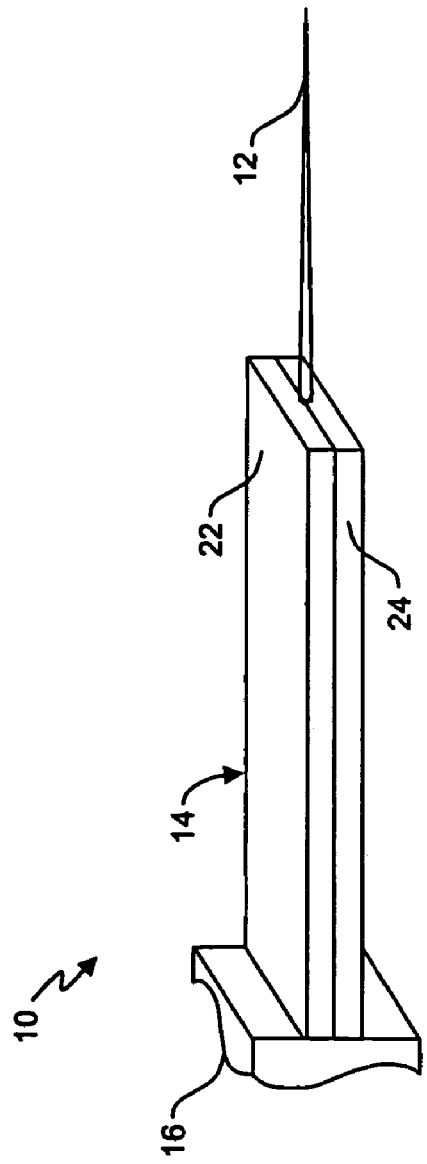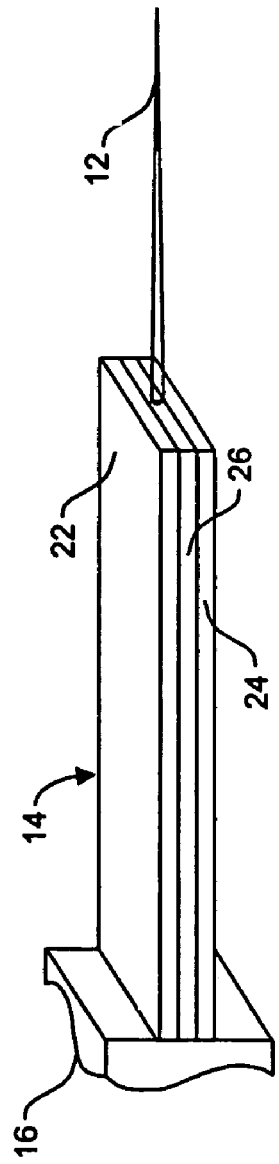

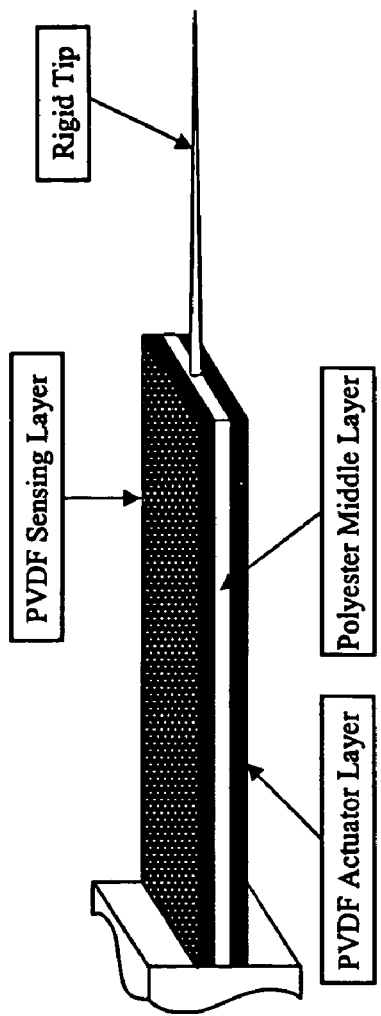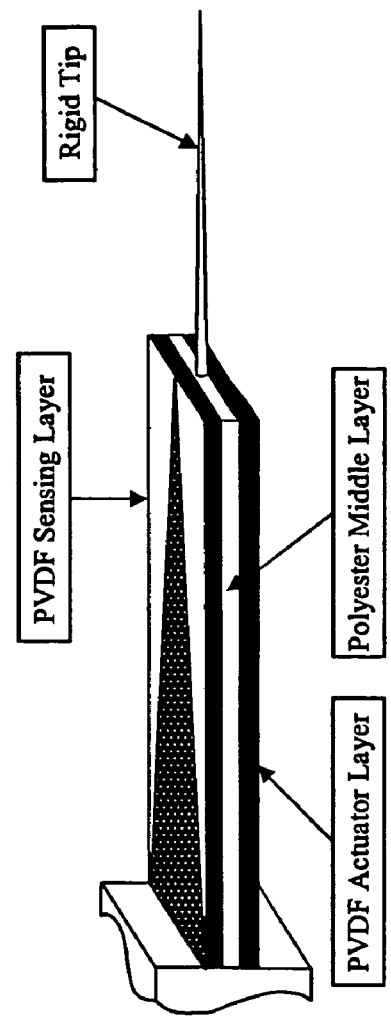

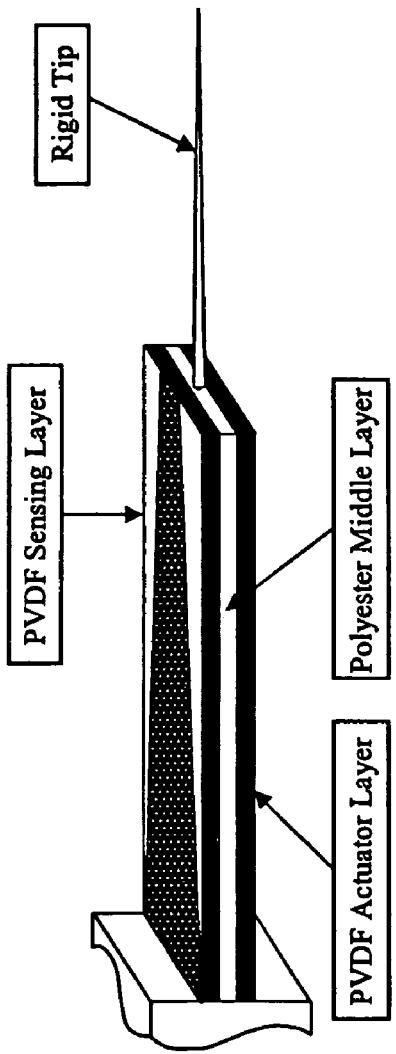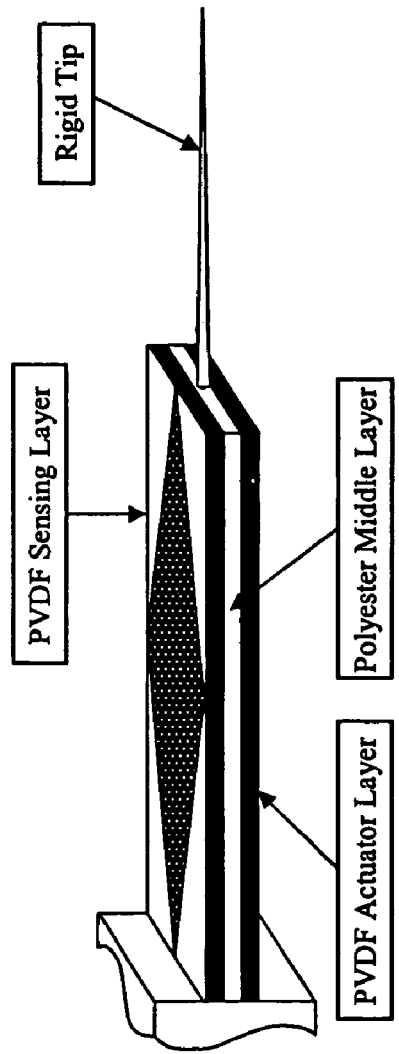

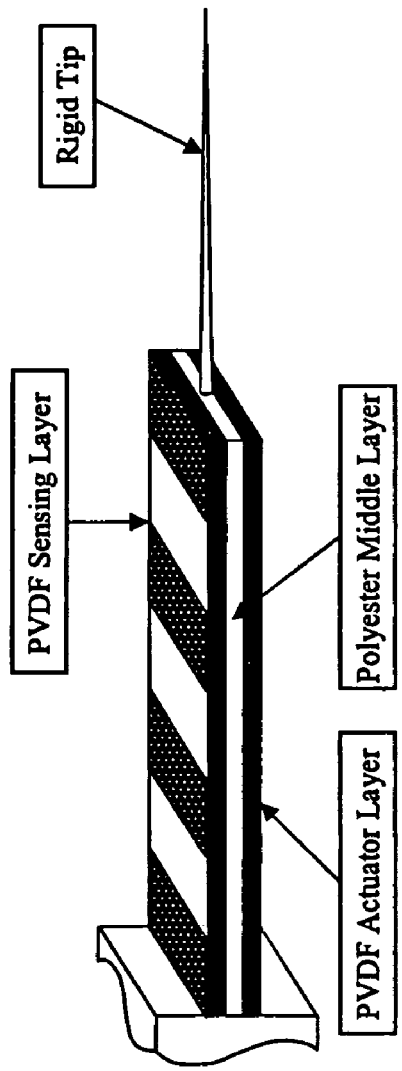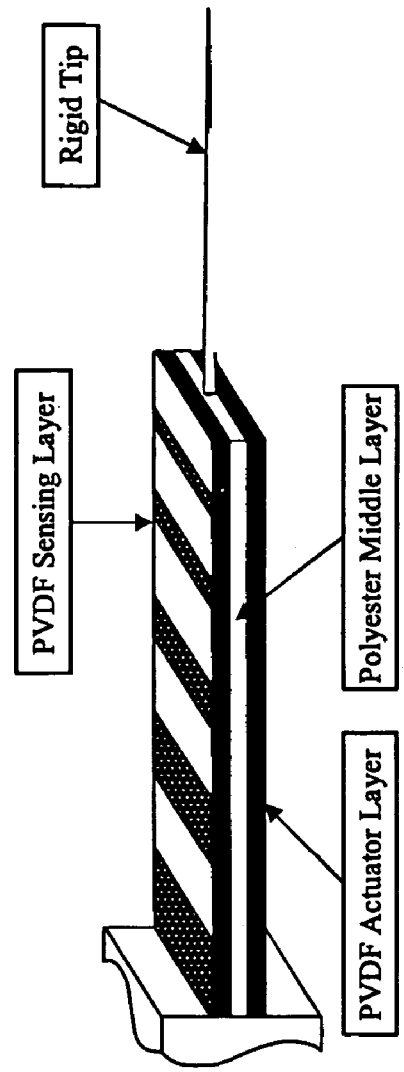

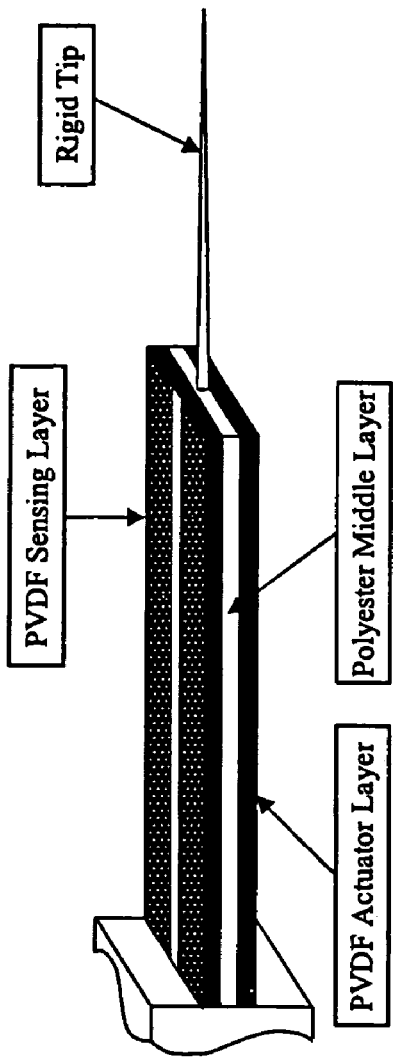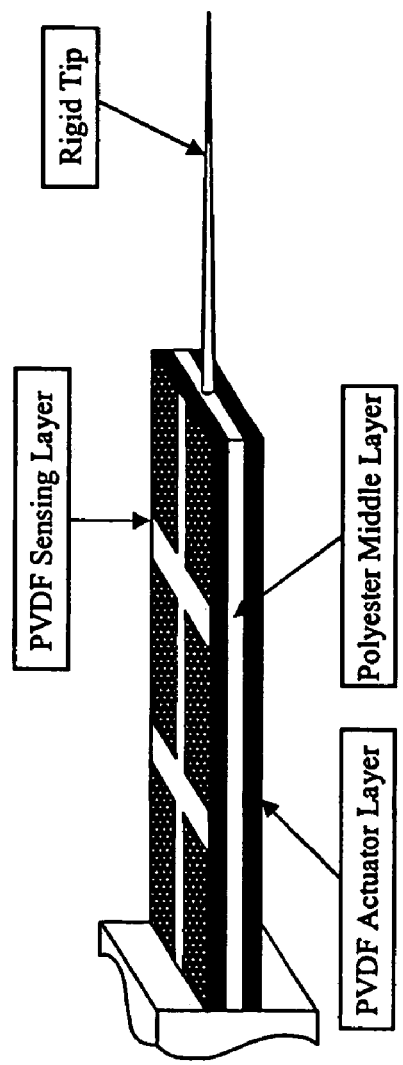

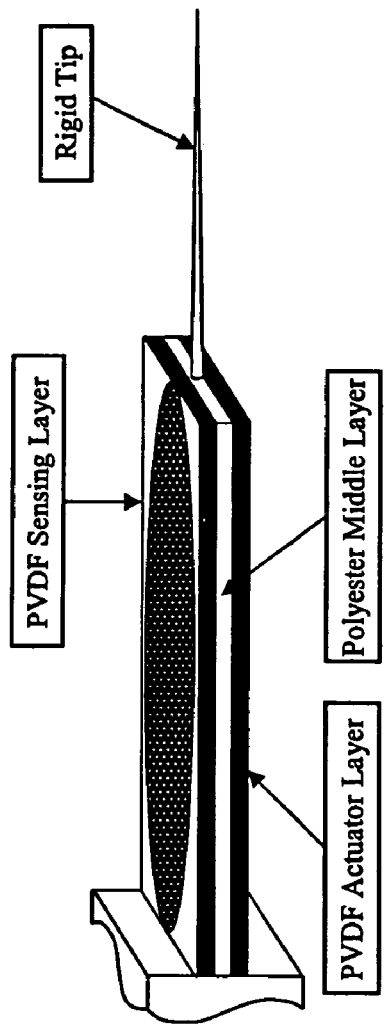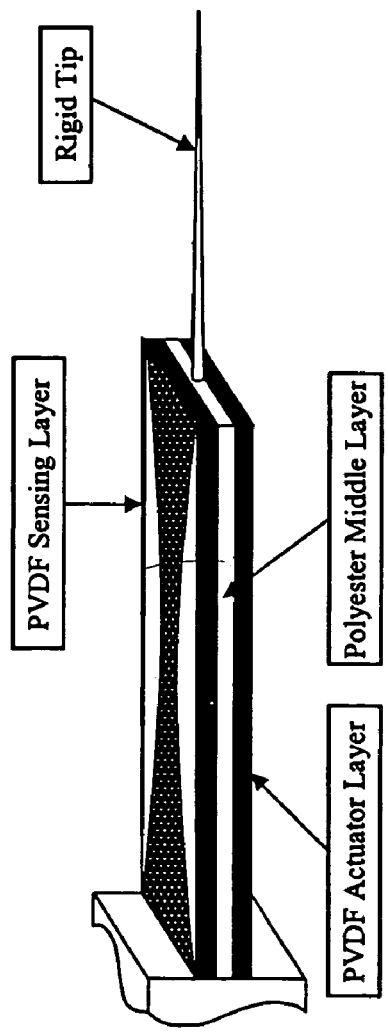

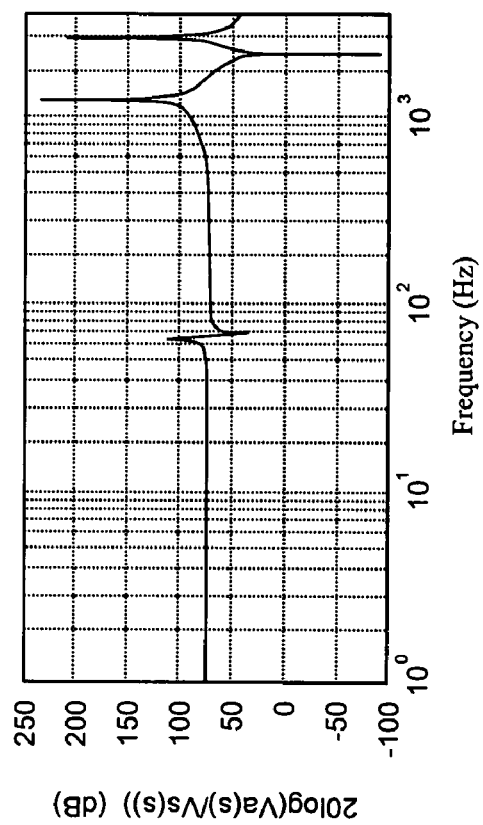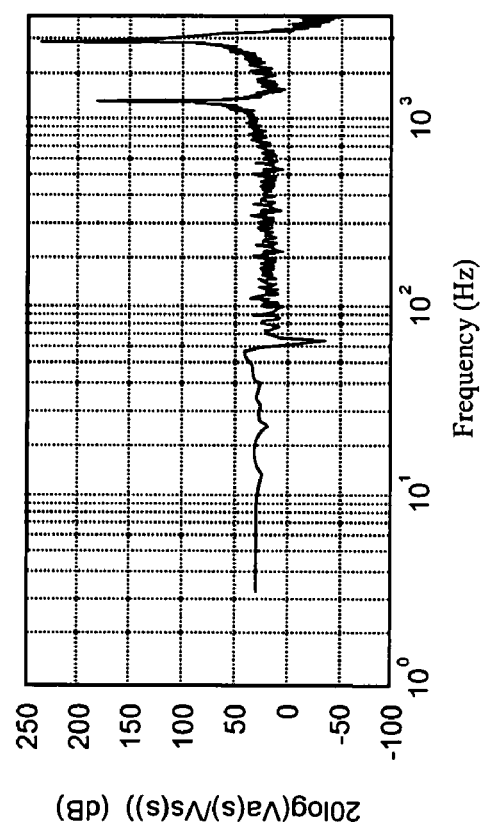

ACTIVE SENSOR FOR MICRO FORCE MEASUREMENT

FIELD OF THE INVENTION

The present invention relates generally to micromanipulation technology and, more particularly, to an active micro-force sensor for use in micromanipulation.

BACKGROUND OF THE INVENTION

Efficient assembly processes for micro devices have not been developed, partially because, at the micro-scale, structures are fragile and easily breakable. Typically breakage at the micro-Newton force range cannot be reliably measured by most existing force sensors. So far the most straightforward and flexible operation methods run in an open loop format using a microprobe to physically manipulate the micro device. This method can be inherently risky without an on-line safety micro force regulation. As a result, this approach decreases overall yield and drives up the cost of micro devices. For these reasons, research into automating the micromanipulation processes have focused on micro force sensing and related control techniques.

In micro force sensing, cantilever beams are the most frequently implemented sensor structure type depending on its highly sensitive factor, and either static or dynamic operation mode. However, cantilever-based sensors introduce significant limitations for micro-force measurements during micromanipulation. First, the cantilever-based sensors have a relatively flexible structure which causes inherent difficulties with accurate manipulation of micro devices. Second, such sensors exhibit only a small dynamic range for maintaining high accuracy. To overcome these limitations, the present invention proposes an innovative active micro-force sensor based on the bilateral mechanical-electrical behaviors of piezoelectric films.

SUMMARY OF THE INVENTION

In accordance with the present invention, an improved active micro-force sensor is provided for use on a micromanipulation device. The active micro-force sensor includes a cantilever structure having an actuator layer of piezoelectric material and a sensing layer of piezoelectric material symmetrically bonded together. When an external force is exerted on the sensor tip, the sensor beam deforms and an applied force signal is detected by the sensing layer. The applied force signal is then fed back to the actuating layer of the sensor via a servoed transfer function or servo controller so that a counteracting deformation can be generated by the bend moment from the servoed actuating layer to quickly balance the deformation caused by the external micro-force. Once balanced, the sensor beam comes back to straight status and the tip will remain in its equilibrium position, thus the sensor stiffness seems to be virtually improved so that the accurate motion control of the sensor tip can be reached, especially, at the same time, the micro-force can also be obtained by solving the counteracting balance voltage applied to the actuating layer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIGS. 1A and 1B are illustrations of two exemplary active micro-force sensors in accordance with the present invention;

FIGS. 3A-3J are illustrations of the active micro-force sensor having different patterned electrode layers;

FIGS. 5A and 5B are graphs illustrating the frequency response of the Va/Vs transfer function by simulation and experiment, respectively.

DETAILED DESCRIPTION OF THE PREFERRED EMBODIMENTS

Figure 2:
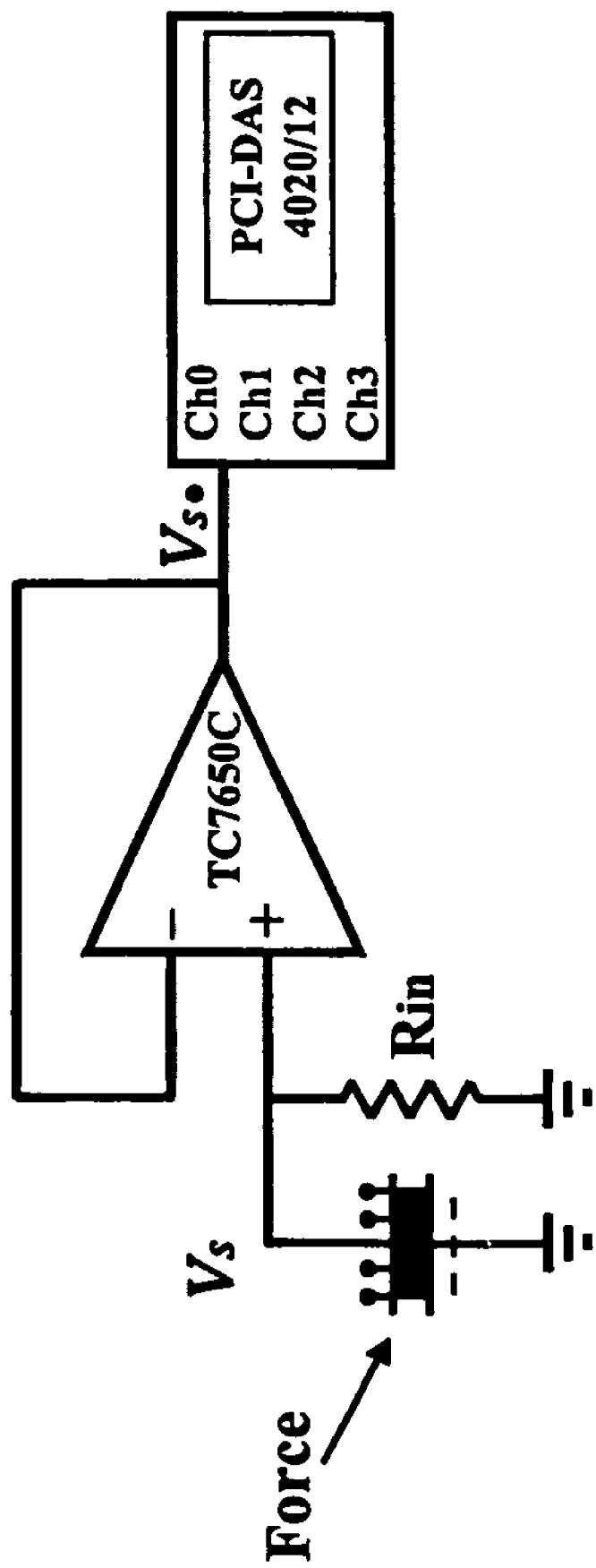
FIG. 2 is a schematic of an exemplary circuit for interfacing with the micro-force sensor of the present invention.

FIGS. 1A and 1B illustrates an active micro-force sensor for use on a micromanipulation device. The force sensor 10 is comprised of a rigid contact tip 12 which extends outwardly from a cantilever 14. The cantilever 14 is in turn coupled to an end of a micromanipulator 16. It is readily understood that the contact tip 12 may have different shapes depending on the applicable micromanipulation tasks.

In accordance with the present invention, the cantilever 14 is a composite structure having at least two layers 22, 24 made from a piezoelectric material (e.g., polyvinylidene fluoride (PVDF) or lead zirconate titanate (PZT)). In operation, the top layer 22 acts as a balance actuator, while the bottom layer 24 works as a sensing device as will be further explained below.

In FIG. 1A, the two layers 22, 24 are bonded directly together using an insulating, waterproof, high strength, and elastic adhesive (e.g. Loctite® Super Glue Gel, Epoxy Gel or RTV Silicone) or other known bonding technique (double side thin glue tape). In this exemplary embodiment, the two piezoelectric layers are in the form of a rectangular plate. However, it is readily understood that other types of materials as well as other suitable shapes for the piezoelectric layers are within the scope of the present invention.

To provide an insulator between the layers 22, 24, it is envisioned that a thin support layer 26 may be interposed between the two outer piezoelectric layers 22, 24 as shown in FIG. 1B. The support layer 26 is preferably made from a polyester material with the function of electrostatic shielding, but other types of thin, elastic, electrostaticity-shielding, and insulating materials are also within the scope of the present invention. Again, the piezoelectric layers 22, 24 are preferably bonded to each side of the support layer 26.

Principles behind an active micro-force sensor having a composite cantilever structure are further described below. Assuming the geometry of the cantilever is much wider and longer than its thickness, the strain $s_y$ along the width of the beam can be assumed to be zero. Based on piezoelectric transverse effect, the unit piezoelectric equation is (without considering the inverse piezoelectric affection and pyroelectric effects):

$$D_3(r,t) = d_{31}\sigma_s(r,t) \tag{1}$$

where $D_3(r,t)$ is the normal electric displacement of a PVDF film, $d_{31}$ is the transverse piezoelectric coefficient and $\sigma_s(r,t)$ denotes the unit stress of the surface of the PVDF sensing layer along beam length.

The surface area polarization gives a charge $Q_s(t)$ across the PVDF sensing layer active surface area A (covered by electrode):

$$Q_s(t) = \int D_3(r,t) dA \qquad (2)$$
$$= \int\int_A D_3(r,t) dy dr.$$

Using the mechanics of materials for cantilever beam, as shown in FIG. 1B, the unit stress on the surface of the PVDF sensing layer 24 can be obtained if the external load $f_c(t)$ acts at the sensor tip $$\sigma_s(r,t) = -cE_s \frac{\partial^2 \omega_s(r,t)}{\partial r^2} \qquad (3)$$
$$\doteq \frac{f_c(t)(L-r)c}{I} + \frac{f_c(t)L_0 c}{I}$$

Notice that since a three-layer composite beam is employed (omitting the effect of thin electrode layers at the top and bottom surfaces of PVDF layers), I will be the moment of the transformed cross section of the composite beam. The neutral axis $c_n$ of the composite beam passes through the centroid of the transformed cross section. c is the distance between the middle of the PDF sensing layer and the neutral axis $c_n$ of the composite beam. $\omega_s(r,t)$ is the elastic deflection of the flexible active composite beam caused by the micro force $f_c(t)$ at the sensor tip, and $0 \leq r \leq L$. Here, the neutral axis of the composite beam can be obtained by $$c_n = \frac{WH_s c_s + \frac{E_m}{E_s} WH_m c_m + WH_a c_a}{A_T}. \qquad (4)$$

where $E_s = E_a$, $E_m$ are Young moduli of the two PVDF layers 22, 24 and the polyester film, respectively. $c_s$, $c_a$, and $c_m$ are the distances of centroid axes of the two PVDF layers 22, 24, and the polyester layer 26 with respect to the base axis of beam, respectively. $H = H_s + H_m + H_a$ is the thickness of the whole composite beam. $A_T$ is the total area of transformed cross section as follows:

$$A_T = WH_s + \frac{E_m}{E_s} WH_m + WH_a. \qquad (5)$$

Then, I, which is around the neutral axis, can be determined by $$I = \frac{WH_s^3}{12} + \frac{E_m}{E_s} \frac{WH_m^3}{12} + \frac{WH_a^3}{12} + WH_s \left(\frac{H_m}{2} + \frac{H_s}{2}\right)^2 + WH_a \left(\frac{H_m}{2} + \frac{H_a}{2}\right)^2 \qquad (6)$$

Since generation of charge is the same along the width of PVDF ($s_y = 0$), we can rewrite equation (2) as:

$$Q_s(t) = \int_0^L d_{31} \sigma_s(r,t) W dr \qquad (7)$$
$$= -cE_s d_{31} W \frac{\partial \omega_s(r,t)}{\partial r}\bigg|_0^L$$
$$= \frac{d_{31} A \left(L_0 + \frac{L}{2}\right) c}{I} f_c(t).$$

Continually, a simplified and effective equivalent circuit model of a capacitor $C_P$ can be used to represent the model of the PVDF sensing layer 24. The output voltage $V_s(t)$ of the PVDF sensing layer 24 caused by the micro force can be described by $$V_s(t) = \frac{Q_s(t)}{C_P}. \qquad (8)$$

By Laplace transformation, the electrical transfer function of the sensing layer is given as:

$$V_s(s) = \frac{Q_s(s)}{C_P}. \qquad (9)$$

To find the dynamic relationship between the sensing output $V_s$ and the micro force $f_c$ acting at the senor tip, we first describe a dynamic model of the flexible PVDF active sensor illustrated in FIG. 1B. Here, the partial differential equation describing the elastic deflection of the flexible composite PVDF sensor is a Bernoulli-Euler equation with an additional term due to the external force and moment. The equation is given by:

$$EI \frac{\partial^4 \omega_s(r,t)}{\partial r^4} + \rho A \frac{\partial^2 \omega_s(r,t)}{\partial t^2} = f_c(t)\delta(r-L) + f_c(t)L_0 \frac{\partial(\delta(r-0) - \delta(r-L))}{\partial r} \qquad (10)$$

where E, I, L and $\rho$ represent the Young's modulus, inertia moment, length of beam, and linear mass density of the composite beam. Assuming that $EI = E_a I_a + E_m I_m + E_s I_s$ is the flexural rigidity of the active beam and $\rho A = \rho_a A_a + \rho_m A_m + \rho_s A_s$ is mass per unit length of the active beam. $f_c(t)$ is the external force acting at the free end of beam, which can be detected by the PVDF sensing layer 24. $\delta(.)$ denotes the Dirac delta function.

The boundary conditions for the above equation are:

$$\omega_s(0,t) = 0 \qquad (11)$$

$$EI \frac{\partial \omega_s(o,t)}{\partial r} = 0 \qquad (12)$$

$$EI \frac{\partial \omega_s^2(L,t)}{\partial r^2} = f_c(t)L_0 \qquad (13)$$

$$EI \frac{\partial \omega_s^3(L,t)}{\partial r^3} = f_c(t) \qquad (14)$$

By using the modal analysis method, we assume that the deformation of the beam have infinite shape modes, then the deflection $\omega_s(r,t)$ can be expressed as an infinite series in the following form:

$$\omega_s(r,t) = \sum_{i=1}^{\infty} \Phi_i(r) q_{si}(t) \qquad (15)$$

where $\Phi_i(r)$ are the eigenfunction satisfying the ordinary differential equation and $q_{si}(t)$ are the modal displacements caused by the micro force. Then the deflection mode shapes are assumed to be:

$$\Phi_i(r) = C_1 \sin(\alpha_i r) + C_2 \cos(\alpha_i r) + C_3 \sinh(\alpha_i r) + C_4 \cosh(\alpha_i r) \tag{16}$$

Substituting the above equations (15) and (16) into the boundary conditions (11)~(14) and taking advantage of the orthogonality conditions, $$\int_0^L \Phi_i(r)\Phi_j(r)\,dr = \delta_{ij} \tag{17}$$

$$\begin{cases} i = j, \delta_{ij} = 1 \\ i \neq j, \delta_{ij} = 0 \end{cases}$$

where $\delta_{ij}$ is the Kronecker delta function, the mode shapes of this cantilever beam are found to be in the form:

$$\Phi_i(r) = C_r[\cos(\alpha_i r) - \cosh(\alpha_i r) + k_L(\sin(\alpha_i r) - \sinh(\alpha_i r))] \tag{18}$$

where $C_r = C_2$, $C_2 \neq 0$ is a constant, $$k_L = \frac{\sin(\alpha_i L) - \sinh(\alpha_i L)}{\cos(\alpha_i L) + \cosh(\alpha_i L)}$$

and $\alpha_i$ are the infinite set of eigenvalues yielded by $$1 + \cos(\alpha_i L)\cosh(\alpha_i L) = 0 \tag{19}$$

and also, the natural frequencies $a_i$ of the sensor beam correspond to the $\alpha_i$ by $$\omega_i = \alpha_i^2 \sqrt{\frac{EI}{\rho A}} \tag{20}$$

In order to determine the dynamics of the system, we use Lagrange's equation of motion by $$\frac{d}{dt}\frac{\partial(E_{sk} - E_{sp})}{\partial \dot{q}_{si}} - \frac{\partial(E_{sk} - E_{sp})}{\partial q_{si}} = Q_i. \tag{21}$$

Here, $E_{sk}$ is the kinetic energy, $E_{sp}$ represents the potential energy and $Q_i$ is the generalized nonconservative forces related to the external micro force. They are $$E_{sk} = \frac{1}{2}\int_0^L \dot{\omega}_s(r,t)^2 \rho A\,dr \tag{22}$$

$$E_{sp} = \frac{1}{2}\int_0^L EI\,\omega_s''(r,t)^2\,dr \tag{23}$$

$$Q_i = f_c(t)\Phi_i(L) + f_c(t)L_0[\Phi_i'(L) - \Phi_i'(0)]$$

where a prime indicates the derivative with respect to position and a dot denotes the derivative with respect to time.

Using the Lagrange's equation of motion (21) and orthogonality conditions (17) and (20), we have the differential equation corresponding to each shape mode of the sensor beam to be $$EI\alpha_i^4 q_{si}(t) + \rho A \ddot{q}_{si}(t) = f_c(t)\Phi_i(L) + f_c(t)L_0[\Phi_i'(L) - \Phi_i'(0)] \tag{24}$$

Then by the Laplace transformation of the above equation, the dynamic relationship between the modal displacements $q_{si}(s)$ and the external micro force is given as $$q_{si}(s) = \frac{f_c(s)(\Phi_i(L) + L_0[\Phi_i'(L) - \Phi_i'(0)])}{\rho A(s^2 + \omega_i^2)}. \tag{25}$$

Based on equations (7) and (9), since $\omega_s(r,s) = \sum_{i=1}^{\infty}\Phi_i(r)q_{si}(s)$, by Laplace transform of equation (7), $Q_s(s)$ can be represented as $$Q_s(s) = -cE_s d_{31} W \omega_s'(r,s)\big|_0^L \tag{26}$$

$$= -cE_s d_{31} W \sum_{i=1}^{\infty}[\Phi_i'(L) - \Phi_i'(0)]q_{si}(s)$$

Substituting equation (26) into equation (9), then we have $$V_s(s) = C_s \sum_{i=1}^{\infty}[\Phi_i'(L) - \Phi_i'(0)]q_{si}(s). \tag{27}$$

where $$C_s = \frac{-cE_s d_{31} W}{C_p}.$$

Subsequently, by combining equations (25) and (27), we have the dynamic sensing model, which denotes the relationship between the output voltage $V_s$ of PVDF sensing layer 24 and the external micro force $f_c$ at the sensor tip as follows:

$$\frac{V_s(s)}{f_c(s)} = C_s \sum_{i=1}^{\infty}\left\{\frac{[\Phi_i'(L) - \Phi_i'(0)]\Phi_i(L)}{\rho A(s^2 + \omega_i^2)} + \frac{L_0[\Phi_i'(L) - \Phi_i'(0)]^2}{\rho A(s^2 + \omega_i^2)}\right\}. \tag{28}$$

To achieve the sensing voltage $V_s$, the PVDF sensing layer 24 is electrically coupled to a sensing circuit. In an exemplary embodiment, the sensing layer 24 is interfaced with a PCI-DAS4020/12 analog/digital input/output board (Measurement Computing Co.) using the electronic buffer circuit as illustrated in FIG. 2. The buffer circuit is constructed using a chopper stabilized operational amplifier TC7650C (Microchip Co.) with a high input impedance $10^{12}\Omega$ and low bias current 1.5 pa (or alternatively ultra low bias current operational amplifiers AD549 (Analog Devices Co.) and OPA111 (Texas Instruments). Thus, the circuit is used to buffer the open circuit voltage $V_s$ of the sensing layer. Resistor $R_{in} > 10^9\Omega$ provides a DC current path. The circuit output $V_{so}$ is a high pass filtered approximation of the voltage $V_s$ and can be sampled by the board which is in turn passed on to a PC. The transfer function between $V_{so}$ and $V_s$ can be represented as:

$$\underbrace{\frac{V_{so}(s)}{V_s(s)} = \frac{sR_{in}C_p}{1+sR_{in}C_p}}_{c_b}. \tag{29}$$

To further remove the 60 Hz noise from the data acquisition system, a zero phase notch filer is added in the data collection program.

To interface with the sensing circuit, an electrode layer covers the surface of the sensing layer 24. Although the electrode layer may fully cover the sensing layer as shown in FIG. 3A, it is envisioned that the electrode layer may be patterned onto the surface of the sensing layer. In general, patterned electrodes are achieved during PVDF film manufacturing by screen printing conductive inks, metal masking during sputtered electrode deposition, or chemically etching patterns by photolithographic techniques. Exemplary patterns for the electrode layer are shown in FIGS. 3B-3J. The reasons for using vary shaped electrode patterns are: (1) re-configure the effective active sensing or actuating area corresponding to the stress concentrating area of the bending cantilever beam; and (2) reduce the pyroelectric effect and thermal drifts being directly proportional to the big active area, the added electrode patches can help to reject the thermal and common-mode noises using a differential measuring compensation principle; (3) enhance the generation of a tip out-of-plane force by the actuating layer as well as the detection of the tip out-of-plane velocity by the sensing layer, so that the distributed sensor/actuator pair could be used for feedback control with unconditional stability; (4) the reduced electrode layer brings down the closed circuit possibility of the electrodes of both sensing and actuating layers; (5) activate the measurement of torque and detection of torsion deformation of sensor beam due to the applied force; (6) enable the multi-point self-sensing so as to obtain feedbacks of strain, bending angle, bending moment, shear force and load of the sensor beam for stability of active servo control. (7) the shaped electrode layer can sense and control individual modes in the structure, this enables a feedback controller to be realized in terms of a suitably shaped area. It should be noted that an electrode layer of the same design is also patterned onto the actuator layer symmetrically.

Finally, by considering the whole sensing system, the global transfer function is $$\frac{V_{so}(s)}{f_c(s)} = C_b C_s \sum_{i=1}^{\infty} \left\{ \frac{[\Phi_i'(L) - \Phi_i'(0)]\Phi_i(L)}{\rho A(s^2 + \omega_i^2)} + \frac{L_0[\Phi_i'(L) - \Phi_i'(0)]^2}{\rho A(s^2 + \omega_i^2)} \right\}. \tag{30}$$

Based on this equation, we can obtain the micro force $f_c(t)$ and force rate $\dot{f}_c(t)$ by measuring the output voltage $V_{so}(t)$ of the sensing layer when the initial values $f_c(t_0)$ and $V_{so}(t_0)$ are known.

The actuator layer 22 serves as a distributed parameter actuator for balancing the deflections of the external micro force. The use of this actuator can virtually improve the stiffness of the high sensitive active sensor structure, so as to enhance the manipulability of flexible sensor and increase the dynamic range when it is mounted at the free end of a micromanipulator.

If a voltage $V_a(r,t)$ is applied to the actuating layer 22, it induces a longitudinal stress $\sigma_a$ on the layer given by:

$$\sigma_a(r,t) = \frac{E_a d_{31}}{H_a} V_a(r,t) \tag{31}$$

where $E_a$ is the Young's modulus of the actuating PVDF film and $H_a$ is the thickness of the PVDF actuating layer 22. The stress due to an applied voltage produces a bending moment $M_a$ along the composite sensor beam's neutral axis given by [20]:

$$M_a = \int_{\frac{H_m}{2}}^{H_m+H_a} \sigma_a(r,t) W y \, dy = C_a V_a(r,t) \tag{32}$$

where $$C_a = \frac{1}{2} E_a d_{31} W (H_a + H_m).$$

Obviously, $C_a$ is a constant which depends on both the geometry and the material properties of the composite sensing/actuating beam.

To seek the transfer function between the actuating $V_a$ and the elastic deflection of the sensor beam at any point along the beam, similar to the sensing layer equations, let's consider the deflection of the sensor beam only caused by the actuating layer 22, then a Bernoulli-Euler equation with an additional terms due to the actuating voltage can be described as follows.

$$\frac{\partial^2}{\partial r^2}\left[EI\frac{\partial^2 \omega_a(r,t)}{\partial r^2} - C_a V_a(r,t)\right] + \rho A \frac{\partial^2 \omega_a(r,t)}{\partial t^2} = 0 \tag{33}$$

where E, I, L, $\rho$ are the same definitions as equation (10) above. $V_a$ represents voltage across the actuating layer 22. $\omega_a(r,t)$ is the deflection of the sensor beam caused by the actuating voltage $V_a$.

Then the boundary conditions for the actuating equation are:

$$\omega_a(0,t) = 0 \tag{34}$$

$$EI\frac{\partial \omega_a(0,t)}{\partial r} = 0 \tag{35}$$

$$EI\frac{\partial^2 \omega_a(L,t)}{\partial r^2} = C_a V_a(L,t) \tag{36}$$

$$EI\frac{\partial^3 \omega_a(L,t)}{\partial r^3} = 0 \tag{37}$$

Similarly, to follow the steps of modeling of the dynamic sensing equations, and using modal analysis method, we have the similar Lagrange's equation of motion by $$\frac{d}{dt}\frac{\partial(E_{ak} - E_{ap})}{\partial \dot{q}_{ai}} - \frac{\partial(E_{ak} - E_{ap})}{\partial q_{ai}} = U_i \tag{38}$$

Here, $E_{ak}$ is the kinetic energy, $E_{ap}$ represents the potential energy and $U_i$ is the generalized non-conservative forces related to the actuating moment. They are $$E_{ak} = \frac{1}{2} \int_0^L \dot{\omega}_a(r,t)^2 \rho A\, dr \quad (39)$$

$$E_{ap} = \frac{1}{2} \int_0^L EI\omega_a''(r,t)^2\, dr \quad (40)$$

$$U_i = C_a[\Phi_i'(L) - \Phi_i'(0)]V_a(t) \quad (41)$$

where $\Phi$ is the shape mode as defined in sensing section. Notice that the voltage $V_a$ is constant along the length on the beam but undergoes a step change at each of the boundaries of this length.

Using the Lagrange's equation of motion (38) and orthogonality conditions (17) and (20), we have the differential equation corresponding to each shape mode to be $$EI\alpha_i^4 q_{ai}(t) + \rho A \ddot{q}_{ai}(t) = C_a[\Phi_i'(L) - \Phi_i'(0)]V_a(t) \quad (42)$$

Then by the Laplace transformation of the above equation, the dynamic relationship between the modal displacements $q_{ai}(s)$ and the input voltage $V_a(s)$ is given as $$q_{ai}(s) = \frac{C_a V_a(s)[\Phi_i'(L) - \Phi_i'(0)]}{\rho A (s^2 + \omega_i^2)} \quad (43)$$

This equation describes the modal displacements of the flexible beam due to a voltage applied to the actuating layer 22.

Thus, the sensing layer 24 can detect the deformation of the sensor beam, the information then is fed back to the actuating layer 22, the actuator will balance the deformation due to the external forces and keep the sensor beam at the equilibrium position (straight). Once balance, the external force can also be equally achieved from the balanced voltage $V_a$ of the actuating layer 22 based on the active servo transfer function between $V_a$ and the force $f_c$. To realize this active behavior, the transfer function from the voltage applied to the actuator layer 22 to the voltage induced in the sensing layer 24 or the external force detected by the sensing layer 24 should be found first.

To balance the deflection $\omega_s(r,s)$ detected by the sensing layer, an opposite deflection $\omega_a(r,s) = -\omega_s(r,s)$ exerted by the actuating layer is necessary. Assumed the shape mode is the same, to balance the deflection, an opposite $q_{si}(s)$ should be exerted by the actuating layer. To achieve the relationship between the sensing voltage $V_s$ and the balance voltage $V_a$, by substituting the opposite $q_{ai}(s) = -q_{si}(s)$ in equation (43) into (27), then we have $$V_s(s) = -C_s \sum_{i=1}^\infty \frac{C_a[\Phi_i'(L) - \Phi_i'(0)]^2 V_a(s)}{\rho A (s^2 + \omega_i^2)}. \quad (44)$$

Continually, the transfer function between the sensing voltage $V_s$ and the balanced voltage $V_a$ can be found as $$\frac{V_a(s)}{V_s(s)} = -\sum_{i=1}^\infty \frac{\rho A (s^2 + \omega_i^2)}{C_s C_a[\Phi_i'(L) - \Phi_i'(0)]^2}. \quad (45)$$

Sequentially, from equation (28), the active servo transfer function between the external force acting at the sensor tip and the balanced voltage $V_a$ in the actuating layer can be given by $$\frac{V_a(s)}{f_c(s)} = -\frac{\sum_{i=1}^\infty \dfrac{C_s\left( \begin{array}{c} [\Phi_i'(L) - \Phi_i'(0)]\Phi_i(L) + \\ L_0[\Phi_i'(L) - \Phi_i'(0)]^2 \end{array}\right)}{\rho A (s^2 + \omega_i^2)}}{\sum_{i=1}^\infty \dfrac{C_s C_a[\Phi_i'(L) - \Phi_i'(0)]^2}{\rho A (s^2 + \omega_i^2)}} \quad (46)$$

The above transfer function equations can be used to generate the balance force and to calculate the micro force applied to the sensor tip during active servo balance. The active servo balance methodologies can be PI, PID, LQR (linear quadratic regulator) compensation, LQG (linear quadratic Gaussian), Luenberger observer based compensator, Kalman-Bucy filter, spatial $H_2$ norm, spatial $H_\infty$ norm. For the multi-electrode-patch pattern, DSFB (direct strain feedback), SFB (shear force feedback) or BMFB (bending moment feedback) can be employed to realize active servo balance as the strain, shear force, bending moment of the sensor beam can be achieved.

An exemplary micro robotic system employing an active micro-force sensor of the present invention is further described below. The micro robotic system is mainly comprised of a SIGNATONE Computer Aided Probe Station and a Mitutoyo FS60 optical microscope system. The micro robot is controlled by a PC-based control system. The system is an open platform which can easily be integrated with the active micro-force sensor of the present invention. To improve the active servo speed, real-time implementation of the proposed control algorithm was performed using an x86 based PC running Linux operating system. The RTAI (Real-time Applications Interface) patch was used to provide POSIX compliant, real-time functionality to the Linux operating system.

The sensing voltage $V_s$ is the input to the PCI-DAS4020/12 acquisition board through a buffer interface circuit as shown in FIG. 2. Based on the transfer function (45), the balance signal (in the range of ±10V) is output to the same PCI-DAS4020/12 acquisition board, furthermore, the signal is linearly amplified to approach to $V_a$ by a power amplifier built by high voltage FET-input operational amplifier OPA445 for the PVDF actuating. The maximum sampling frequency of PCI-DAS4020/12 is 20 MHz with 12-bit AD resolution. The loop time of the force sensing and control system is about 60 μs. To reduce the vibrations from the environment, an active vibration isolated table was used during the experiments.

Figure 4:
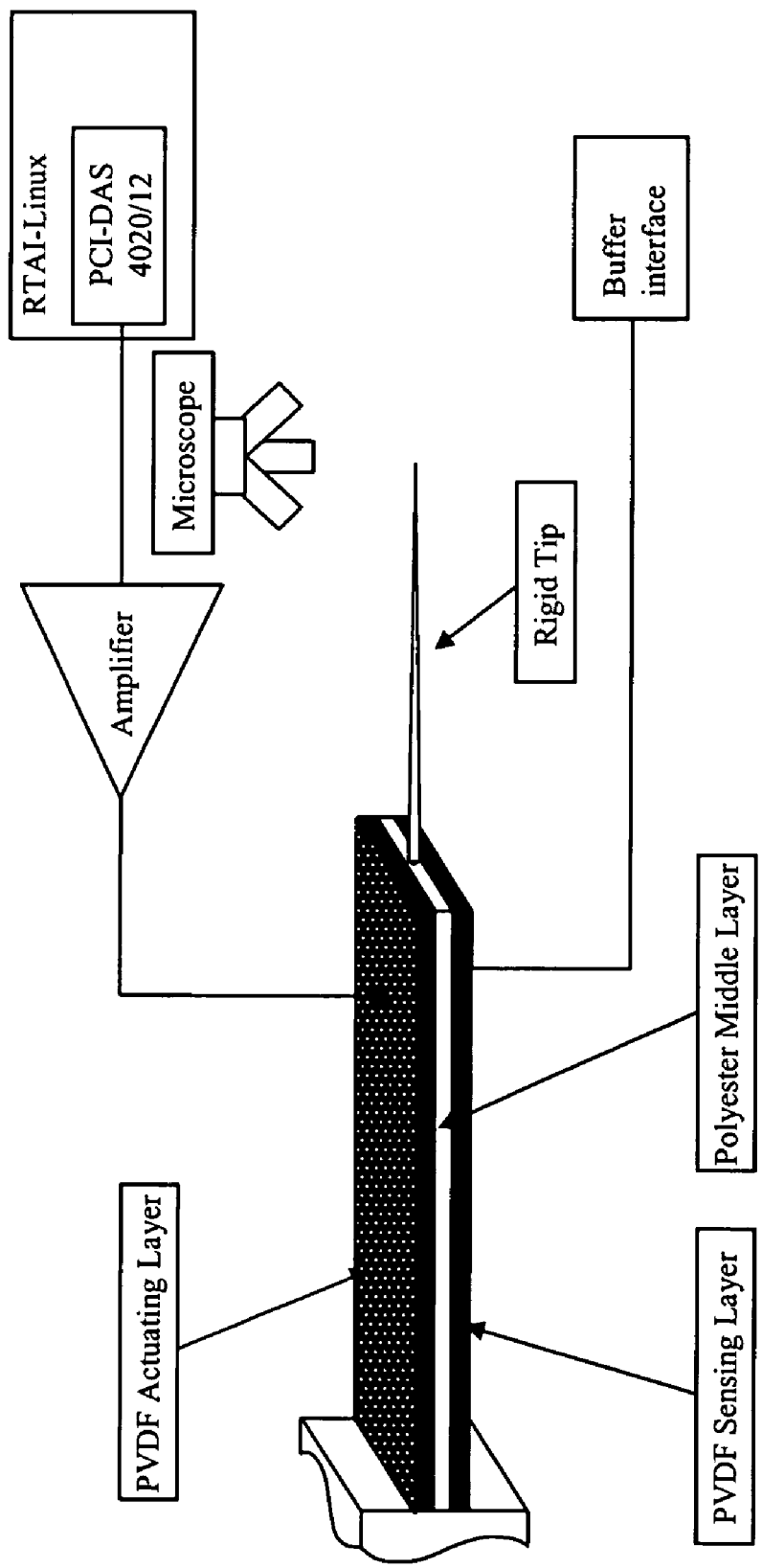
FIG. 4 is a block diagram of an active sensing and balance servo system for the micro-force sensor of the present invention.

FIG. 4 depicts a block diagram of the active sensing system. As shown, it is a typical single-input-single-output feedback control loop. The feedback signal is generated by the sensing layer due to the external force at the sensor tip. The signal is conditioned by a buffer interface and filtered in the collection program. The signal is then adjusted and amplified to apply to the actuating layer 22 based on the transfer function (45).

In this exemplary system, the active force sensor has the following dimensions and parameters: L=0.01864868 m; W=0.00979424 m; $L_0$=0.0255778 m; $C_P$=0.88×10⁻⁹ F; $d^{31}$=23×10⁻¹² C/N; c=102.5×10⁻⁶ m; $H_a$=$H_s$=45×10⁻⁶ m; $H^m$=125×10⁻⁶ M; $E_a$=$E_s$=2×10⁹ N/m²; $E_m$=3.8×10⁹ N/m²;

$P_a=P_s=1.78\times10^3$ Kg/m³; $P_m=1.39\times10^3$ Kg/m³. It will be appreciated that these types of the systems may be constructed with many different configurations, components, and/or values as necessary or desired for a particular application. The above configurations, components and values are presented only to describe one particular embodiment that has proven effective and should be viewed as illustrating, rather than limiting, the present invention.

The transfer function between the actuating voltage $V_a$ and the sensing voltage $V_s$ is a key for active sensing. Using the $V_a/V_s$ transfer function, the frequency response of the active sensor is demonstrated by simulation as shown in FIG. 5A. To test the model, we exert the known voltage signal in the range of ±30V to the actuating layer, then record the sensing voltage due to the deflection of sensor beam. FIG. 5B shows the experimental result in the relationship between the $V_a$ and $V_s$. It can be observed that the two Bode results (comparison of three shape modes) are very close and verify the effectiveness of the developed transfer function model. For this active sensor, the frequency of the first shape mode is about 69 Hz, the second shape mode is 1.2 KHz, the third one is about 2.9 KHz. In summary, to balance the external micro force, by feedback the sensing voltage to the actuating layer through the transfer function (45) in real time, the active micro-force sensor of the present invention can be realized.

Figure 6:
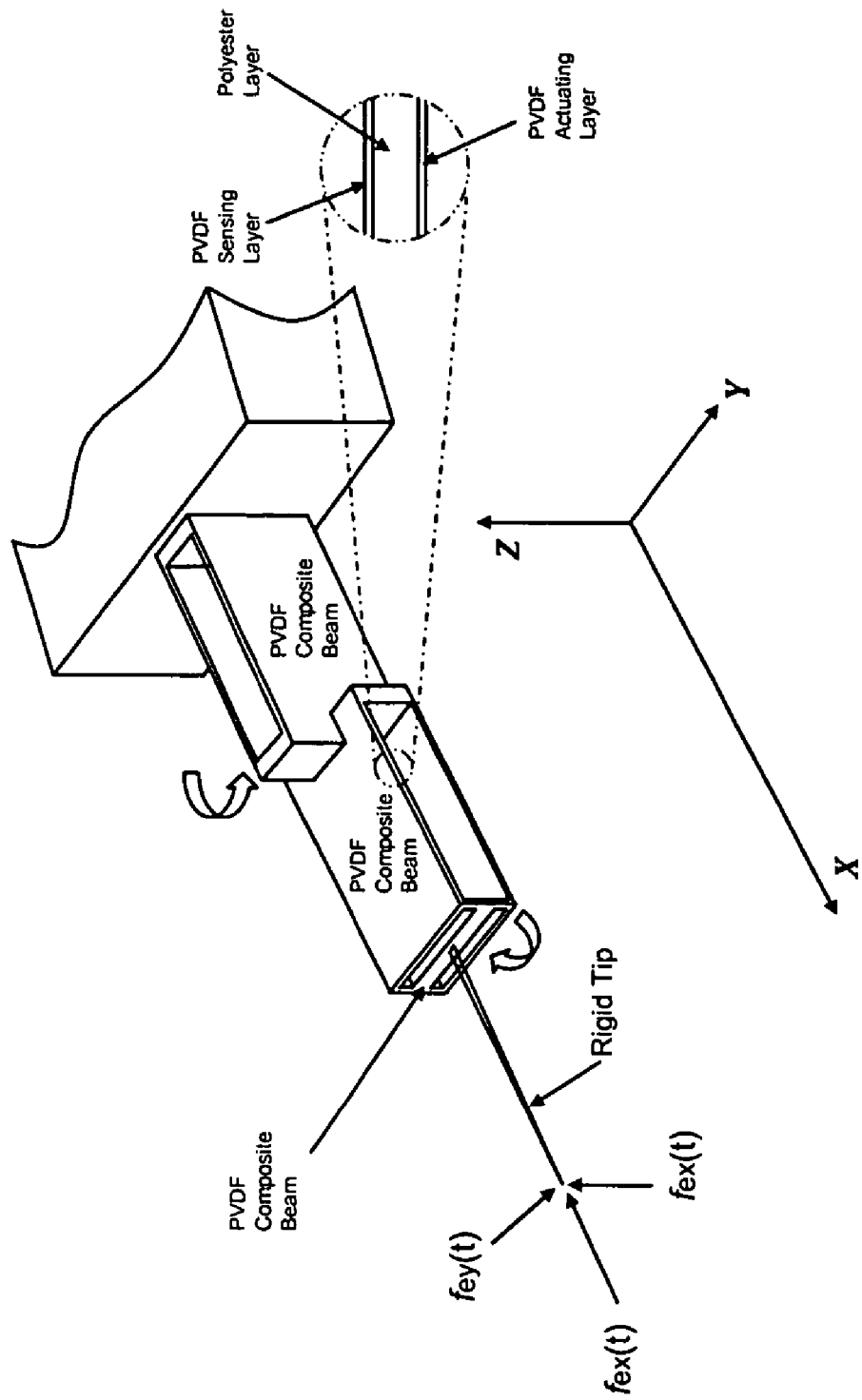
FIG. 6 depicts an exemplary three-dimensional active micro-force sensor in accordance with the present invention.

In addition, the two composite active PVDF films with different pyroelectric orientations can be chosen to construct a parallel-beam structure, then two voltage variations $\Delta V_{pyro}$ due to pyroelectric effect in two PVDF beams are opposed. As the two films are connected in parallel at the input of the buffer interface circuit or the amplifier circuit, then the pyroelectric effects of this kind of structure can be self compensated. Based on the active parallel-beam structure with the function of self thermo-compensation, a multi-axis (3-D) active micro force sensor is also designed as shown in FIG. 6. The active beams of the sensor are aligned perpendicularly to each other, so the 3-D sensor structure also provides a decoupled force measurement in three directions. The sensing model of PVDF sensing layers in a parallel beam construction can be developed based on the formulations of the one-piece cantilever construction described above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active micro-force sensor for use on a micromanipulation device, comprising:
a cantilever structure in a form of a plate which extends lengthwise away from a connection point to the micromanipulation device, the cantilever structure having an actuator layer of piezoelectric material and a sensing layer of piezoelectric material;
a contact tip or tool extending outwardly from the cantilever structure at a distal end from the connection point to the micromanipulation device
a sensing circuit electrically coupled to the sensing layer and operable to measure a voltage thereon; and
an actuating circuit configured to receive the voltage from the sensing circuit and operable to maintain rigidity of the cantilever structure during a manipulation operation by applying a voltage to the actuating layer, wherein the voltage applied to the actuating layer represents a force exerted on the contact tip or tool.

2. The active micro-force sensor of claim 1 wherein the sensing circuit is further operable to determine a rate of change of a force exerted on the contact tip or tool.

3. The active micro-force sensor of claim 1 wherein the cantilever structure having a substantially rectangular shape.

4. The active micro-force sensor of claim 1 wherein the piezoelectric material is further defined as a polyvinylidene fluoride material or a lead zirconate titanate material.

5. The active micro-force sensor of claim 1 wherein the actuator layer and sensing layer are bonded directly together using an insulating, elastic adhesive.

6. The active micro-force sensor of claim 1 further comprises a support layer interposed between the actuator layer and the sensing layer.

7. The active micro-force sensor of claim 6 wherein the support layer is comprised of a polyester material with a function of electrostatic shielding.

8. The active micro-force sensor of claim 6 wherein the sensing layer and actuating layer are symmetrically patterned onto the support layer using either screen printing conductive inks, metal masking during sputtered electrode deposition or chemically etching patterns by photolithographic techniques.

9. The active micro-force sensor of claim 1 wherein the actuating circuit includes a closed-loop linear-quadratic regulator servo controller that generates the voltage applied to the actuating layer.

10. The active micro-force sensor of claim 1 wherein the actuating circuit implements an active servo transfer function given by $$\frac{V_a(S)}{f_c(S)} = -\frac{\sum_{i=1}^{\infty}\frac{C_s([\Phi_i'(L)-\Phi_i'(0)]\Phi_i(L)+L_0[\Phi_i'(L)-\Phi_i'(0)]^2)}{\rho A(s^2+\omega_i^2)}}{\sum_{i=1}^{\infty}\frac{C_sC_a[\Phi_i'(L)-\Phi_i'(0)]^2}{\rho A(s^2+\omega_i^2)}}$$

where $f_c(s)$ is the force exerted on the contact tip, $V_a(S)$ is the voltage applied to the actuating layer, L is the length of the cantilever, $\Phi_i(r)$ are the eigenfunctions satisfying an ordinary differential equation at r (023 r≦L) along the cantilever, $\Phi_i'(L)$ and $\Phi_i'(0)$ represent the derivative eigenfunction at the free end (L) and the fixed end (0) with respect to position, respectively, s is the Laplace operator, $\omega_i$ are the natural frequencies of the cantilever corresponding to the different eigenvalues, $L_0$ is the length of the sensor rigid tip, $C_a$ is a constant that depends on the geometry of the cantilever PVDF composite beam and $\rho A$ represents the mass per unit length of the cantilever.

11. An active micro-force sensor for use on a micromanipulation device, comprising:
a cantilever structure in a form of a plate which extends lengthwise away from a connection point to the micromanipulation device, the cantilever structure having a support layer disposed between a sensing layer of piezoelectric material and an actuator layer of piezoelectric material
a contact tip or a tool extending outwardly from the cantilever structure at a distal end from the connection point to the micromanipulation device
a sensing circuit electrically coupled to the sensing layer and operable to detect deformation of the cantilever structure; and an actuating circuit electrically coupled to the sensing circuit and operable to counteract any deformation experienced by the cantilever structure by applying a voltage to the actuating layer, wherein the voltage applied to the actuating layer represents a force exerted on the contact tip or tool.

12. The active micro-force sensor of claim 11 wherein the sensing circuit is further operable to determine a rate of change of a force exerted on the contact tip.

13. The active micro-force sensor of claim 11 wherein the cantilever structure having a substantially rectangular shape.

14. The active micro-force sensor of claim 11 wherein the piezoelectric material is further defined as a polyvinylidene fluoride material or a lead zirconate titanate material.

15. The active micro-force sensor of claim 11 wherein the support layer is comprised of a polyester material.

16. A microforce sensing system, comprising:
a force sensor having a contact tip or a tool extending outwardly from a cantilever structure and operable to detect a contact force exerted on the contact tip or the tool, wherein the cantilever structure includes an actuator layer of piezoelectric material and a sensing layer of piezoelectric material; and
a processing circuit adapted to receive a sensing signal indicative of the contact force from the sensing layer and operable to feed a balance signal to the actuator layer which maintains rigidity of the cantilever structure, where the balance signal correlates to the contact force exerted on the contact tip or the tool.

17. A micro robotic system, comprising:

a micromanipulator;

an active force sensor having a cantilever structure in a form of a plate which extends lengthwise from a connection point to the micromanipulator and a contact tip or a tool extending outwardly from the cantilever structure at a distal end from the connection point the micromanipulator, wherein the cantilever structure includes an actuator layer of piezoelectric material and a sensing layer of piezoelectric material bonded together; and a processing circuit electrically coupled to the sensing layer to detect deformation of the cantilever structure and oPerable to counteract any deformation experienced by the cantilever structure by applying a voltage to the actuating layer, wherein the voltage applied to the actuating layer represents a force exerted on the contact tip or tool.

* * * * *

UNITED STATES PATENT AND TRADEMARK OFFICE
CERTIFICATE OF CORRECTION

PATENT NO.         : 7,367,242 B2                                            Page 1 of 1
APPLICATION NO.    : 11/366014
DATED              : May 6, 2008
INVENTOR(S)        : Xi et al.

It is certified that error appears in the above-identified patent and that said Letters Patent is hereby corrected as shown below:

In the Specification

Column 1, line 3, before "FIELD OF THE INVENTION" insert --GOVERNMENT CLAUSE
This invention was made with government support under DMI0115355 awarded by the National Science Foundation. The government has certain rights in the invention.--

Signed and Sealed this
Twenty-fourth Day of December, 2013

Margaret A. Focarino
*Commissioner for Patents of the United States Patent and Trademark Office*